United States Patent [19]
Collin et al.

[11] Patent Number: 6,108,416
[45] Date of Patent: Aug. 22, 2000

[54] COMMUNICATION DEVICE WITH ACOUSTIC PATH PASSING THROUGH KEYBOARD KEY

[75] Inventors: Pascal Collin; Guillaume Leterrier, both of Le Mans, France

[73] Assignee: U.S. Philips Corporation, New York, N.Y.

[21] Appl. No.: 09/058,535

[22] Filed: Apr. 10, 1998

[30] Foreign Application Priority Data

Apr. 11, 1997 [FR] France ................................. 97 04455

[51] Int. Cl.[7] ................................................. H04M 1/00
[52] U.S. Cl. ........................................ 379/433; 379/368
[58] Field of Search ................................... 379/433, 421, 379/422, 368, 369, 370

[56] References Cited

U.S. PATENT DOCUMENTS 5,265,274   11/1993   Knutson et al. ........................ 455/347

FOREIGN PATENT DOCUMENTS

| | | | |
|---|---|---|---|
| 0275996A2 | 7/1988 | European Pat. Off. | ......... H04M 1/02 |
| 08065367A | 3/1996 | Japan | ............................. H04M 1/02 |
| 2087686 | 5/1982 | United Kingdom | ................... 379/421 |

*Primary Examiner*—Jack Chiang
*Attorney, Agent, or Firm*—Jack D. Slobod

[57] ABSTRACT

A communication device includes a keyboard with key functions and a microphone connected to the outside of the housing of the device by an acoustic path which opens to the outside of the device through one of the keys of the keyboard. The microphone is accommodated either on the inside of the key, or in another arbitrary area inside the device, while still being connected to the acoustic path by an acoustic channel.

8 Claims, 2 Drawing Sheets

COMMUNICATION DEVICE WITH ACOUSTIC PATH PASSING THROUGH KEYBOARD KEY

FIELD OF THE INVENTION

The present invention relates to a communication device notably comprising a function keyboard with keys and a microphone connected to the outside of the housing of the device by an acoustic path. The invention is applicable particularly to telephony devices.

BACKGROUND OF THE INVENTION

Japanese patent application no. 08065367A, filed Aug. 16, 1994 and published Mar. 8, 1996 describes a telephony device notably comprising a dialling keyboard with keys, accessible on the outside of the housing of the device, and a microphone. This microphone is provided in the housing of the device, at the bottom of the device opposite the earphone, and a short acoustic path passes through the wall of this housing for guiding speech from the speakers to the microphone. Although the location chosen for the microphone is the location that suits a user best, it occupies, however, a place that cannot be neglected, all the more so since in the embodiment described in the cited document an indicator light and various connections are associated to the microphone, while the assembly constituted in this manner is furthermore covered by a movable cap.

SUMMARY OF THE INVENTION

It is an object of the invention to propose an original solution for achieving a reduction of the dimensions of the telephony devices as the device described above.

For this purpose, the invention relates to a telephony device as described in the opening paragraph of the description and which is furthermore characterized in that said acoustic path opens to the outside of the device by passing through one of the dialing keys of the keyboard.

The structure thus proposed, applicable when a microphone is present in a product comprising a function keyboard, notably permits to reduce the length of the housing of the device while thus integrating this microphone in an existing dialing key of the keyboard and, therefore, also its volume. The consequence of the realization of this object is also a diminishing of the manufacturing cost of the device.

According to a particular embodiment, the microphone is accommodated inside this key comprising the acoustic path. According to another embodiment which corresponds to the microphone having another place, this microphone is accommodated in an arbitrary area inside the device, an acoustic channel being associated to the acoustic path for ensuring the continuity of the acoustic link up to the microphone. In either case, the key comprising the acoustic path is advantageously (for reasons of symmetry) one of the cells that are situated near to the longitudinal axis of the device, which removes any problem of different acoustic sensitivity for right-handed and left-handed persons. Among the keys located in this manner, the key concerned is preferably that situated nearest to the end of the housing, generally the "0" key on telephone keyboards as they are currently standardized.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
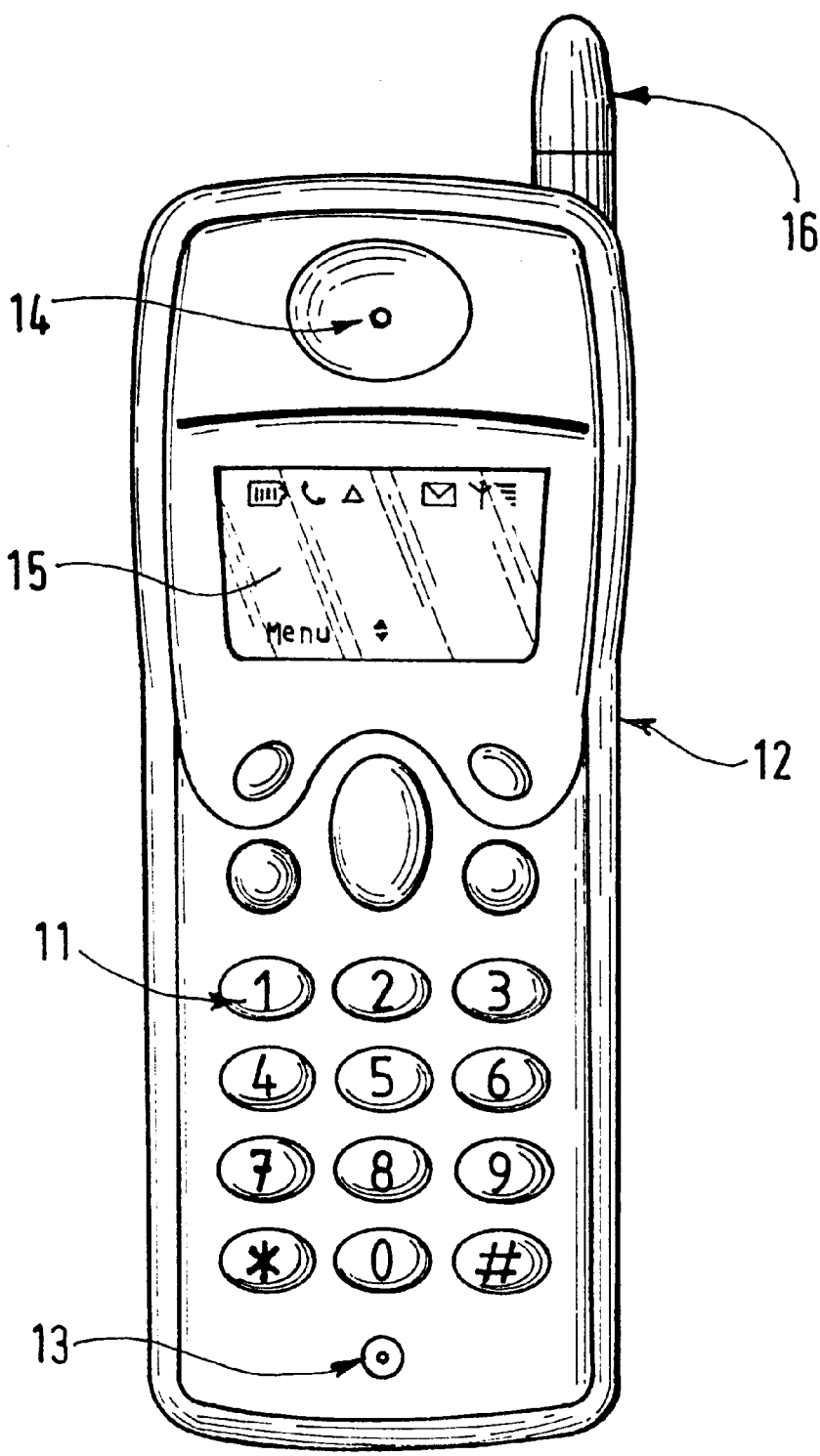
FIG. 1 shows an example of a portable telephony device in which the invention may be used.

FIG. 1 corresponds to the case where the invention, although it has a more general scope in its application, is used in a portable telephony device. The device shown notably comprises a keyboard 11 present on one of the faces of the device and oriented to the outside of the housing 12 of this device, and a microphone. More precisely, the microphone is inside the housing 12 and thus invisible, but it is connected to the outside of the device by an acoustic path 13. A path is understood to mean here any longer or shorter opening or, on the contrary, a very short opening (as short as may be), providing a specific passage to the sounds intended to be received by the microphone, as the opening is found at the very end of the path or, on the contrary, placed farther, at an arbitrary position inside the device, for example, at the end of an acoustic channel which ensures the relay between the acoustic path and the microphone. The usual array of the twelve dialing keys 1 to 9, 0, * and # are among the main keys shown. The device also includes as visible elements in FIG. 1 an earphone 14, a screen 15 and an antenna 16.

Figure 2:
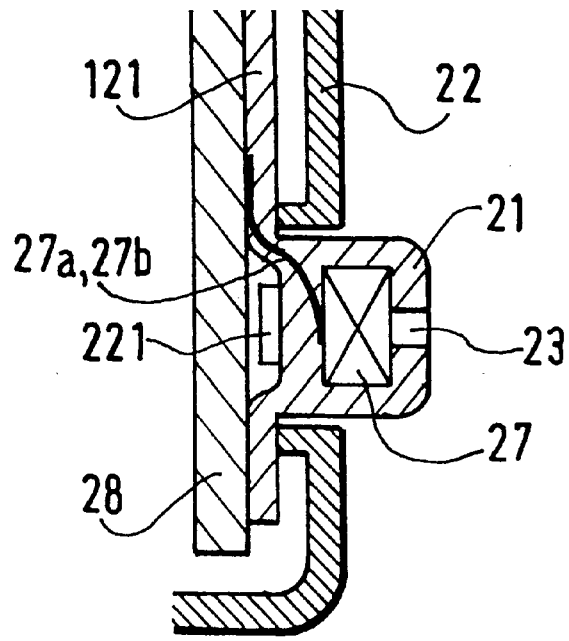
FIG. 2 is a cross-sectional diagram of a part of the housing of a telephony device, illustrating an embodiment of the invention.

According to the invention, and as shown in the cross-sectional diagram of FIG. 2, considerable gain of space is obtained by no longer installing the microphone in the area situated between the keys of the keyboard and the bottom end of the housing, but in such a way that the acoustic path now referenced 23 opens to the outside of the housing 22 of the device by passing through a dialing key of the keyboard, here referenced 21.

In principle, this key could be an arbitrary key of the keyboard. However, for reasons of symmetry and in order that the product may be used by both left-handed and right-handed persons, the choice is rather made in favor of one of the keys situated along the longitudinal axis of the housing of the device (the keys 2, 5, 8, 0 on current keyboards), with a preference (this is the solution represented in FIG. 2) to that which is nearest to the bottom end of the housing (generally, the 0 key). The microphone 27 is situated in the key 21. On one side of the microphone, the path 23 connects this microphone to the outside of the housing 22 for capturing the transmitted sounds there, whereas, on the other side, to the inside of the housing, two connections 27a, 27b electrically connect the microphone to a printed circuit board 28.

Figure 3:
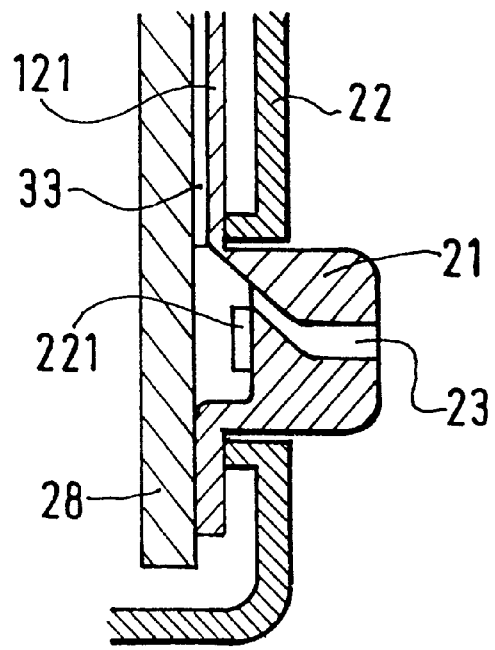
FIG. 3 is a similar cross-sectional view corresponding to a variant of the embodiment of the invention.

In a variant of an embodiment shown in FIG. 3, the microphone is no longer accommodated in the key 21, but displaced a little further, away from the keys, in another arbitrary area available in the housing 22 of the device. A channel 33 is then provided in the extension of the path 23 to ensure the continuity of the acoustic link up to the microphone (not shown), by guiding sound waves coming from the outside. The channel 33 consists, for example, of a recess along the face of the printed circuit which is oriented to the keyboard and whose opening, in the recess behind the key is opposite that of the path 23. The microphone, even if it is displaced, continues to be well connected to the printed circuit board 28 by a pair of electrical conductors (not shown either).

Whatever the variant of the embodiment shown, the keyboard continues to be realized in the following manner. It generally comprises a planar elastomer membrane 121 (see, for example, FIG. 2), but to which the various keys (key 21 and all the other keys whatever their number and place, possibly different according to the invention: telephony device, intercom, etc . . . ) are connected while forming only one and the same part with the membrane. This membrane 121 is provided for being fixed or connected to the printed circuit 28 which comprises all the necessary contact elements and conducting tracks.

As shown in FIG. 2 (or FIG. 3), each key (21 or other) of the elastomer membrane comprises an electrical contact 221, for example, made of carbon, silk-screen printed on the bottom of a recess provided in the key. This contact is intended to be connected to a track or conducting in the printed circuit 28 when the user exerts a pressure on the respective key. The type of the elastomer substance and the form of the keys are studied so that when said pressure is release, each key comes back to its rest position (as is represent).

What is claimed is:

1. A communication device comprising a function keyboard including an array of dialing keys 1 to 9, 0, * and #, and a microphone connected to the outside of the housing of the device by an acoustic path which passes through at least one of said dialing keys of the keyboard.

2. The device as claimed in claim 1, wherein the microphone is accommodated inside the at least one of said dialing keys through which the acoustic path passes.

3. The device as claimed in claim 1, wherein the microphone is accommodated in an arbitrary area inside the device.

4. A device as claimed in claim 2, wherein the at least one of said dialing keys through which the acoustic path passes is situated along a central longitudinal axis of the device directed between a top end and a bottom end of the housing.

5. The device as claimed in claim 4, wherein among the dialing keys situated on the central longitudinal axis of the array, the at least one of said dialing keys through which the acoustic path passes is the key situated nearest to the bottom end of the housing.

6. A telephony device comprising a keyboard including an array of dialing keys 1 to 9, 0, * and #, and a microphone which has an acoustic link with the outside of the housing of the device via an acoustic path which passes through at least one of said dialing keys of the keyboard.

7. A device as claimed in claim 3, wherein the at least one of said dialing keys through which the acoustic path passes is situated along a central longitudinal axis of the device directed between a top end and a bottom end of the housing.

8. The device as claimed in claim 7, wherein among the dialing keys situated on the central longitudinal axis of the array, the at least one of said dialing keys through which the acoustic path passes is the key situated nearest to the bottom end of the housing.

* * * * *